Figure 1:
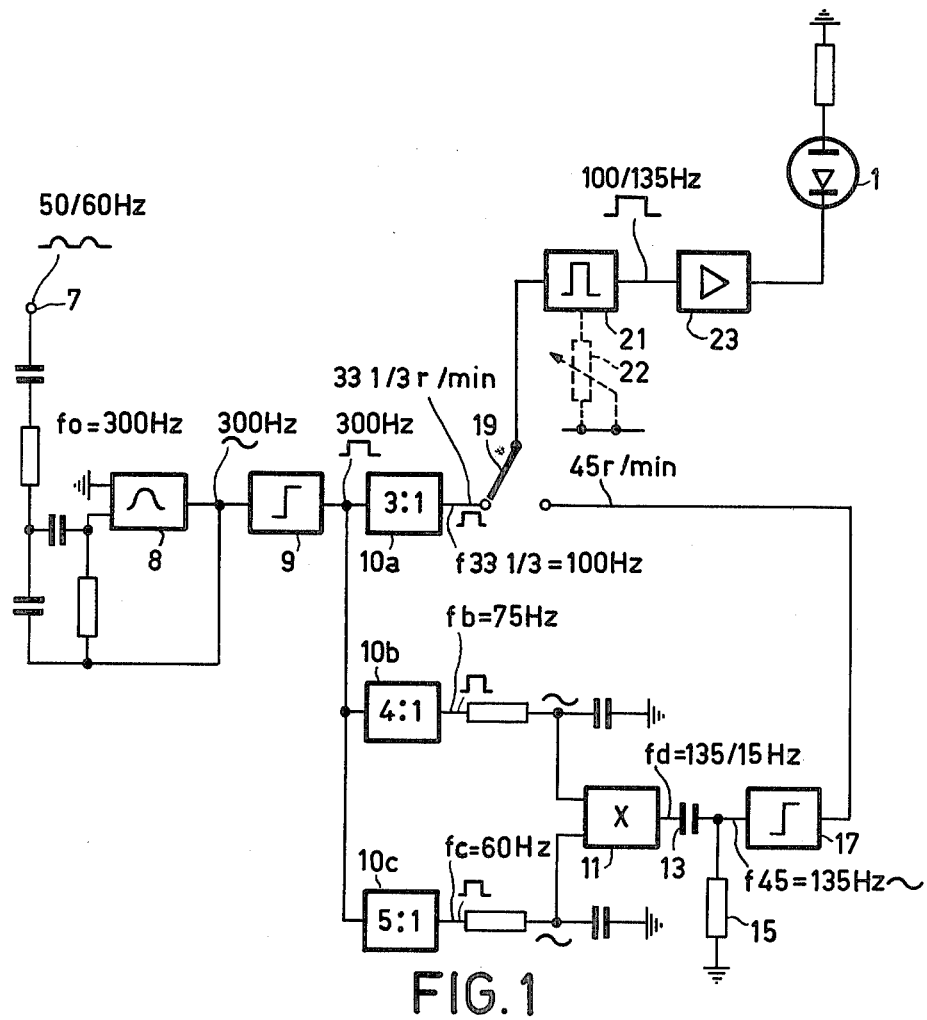

United States Patent [19]

Seitz

[11] 4,225,227
[45] Sep. 30, 1980

[54] MULTIPLE SPEED STROBOSCOPE DEVICE

[75] Inventor: Alfred Seitz, Berlin, Fed. Rep. of Germany

[73] Assignee: U.S. Philips Corporation, New York, N.Y.

[21] Appl. No.: 954,261

[22] Filed: Oct. 24, 1978

[30] Foreign Application Priority Data

Oct. 29, 1977 [DE] Fed. Rep. of Germany ....... 2748704

[51] Int. Cl.² .............................................. G01P 3/40
[52] U.S. Cl. .................................. 356/23; 315/241 S
[58] Field of Search ....................... 356/23; 315/241 S

[56] References Cited

U.S. PATENT DOCUMENTS

| 1,641,136 | 8/1927 | Dorn | 356/23 |
| 1,933,305 | 10/1933 | Belt | 356/23 |
| 2,418,651 | 4/1947 | Mausshardt | 356/23 X |

Primary Examiner—F. L. Evans
Attorney, Agent, or Firm—David R. Treacy

[57] ABSTRACT

A stroboscope device for a record player for monitoring at least two speeds such as 33⅓ and 45 r.p.m. A turntable rim may be provided with a single stroboscope pattern for the relevant speeds. As they pass a light pulse generator, the marks of the stroboscope pattern are optically comparable with light pulse trains produced by a light pulse generator at one of a plurality of frequencies obtained from a given or a-c mains frequency.

8 Claims, 2 Drawing Figures

MULTIPLE SPEED STROBOSCOPE DEVICE

The invention relates to a stroboscope device for monitoring at least two different nominal speeds; and more particularly to such a device on a record player for monitoring at least two turntable speeds (33⅓ and 45 r.p.m.).

Stroboscope devices are generally known on high-quality record players. Such stroboscope devices comprise a stroboscope ring on the turntable rim, which is generally scanned optically by means of light. Since record players operate with at least two speeds (33⅓ and 45 r.p.m.), two adjacent stroboscope rings are used. It is also known to superimpose the stroboscope patterns or rings (DT-OS No. 25 05 128). However, a drawback of such a super-position is that the readability of the overlapping marks is impaired.

Whereas in Europe generally a mains frequency of 50 Hz is used, non-European mains, such as for example, those in the United States of America, supply alternating current with a frequency of 60 Hz. This means that a record player which is adapted to 50 or 60 Hz mains requires four stroboscope rings. Turntables with four stroboscope rings are very intricate to manufacture and demand a comparatively high turntable rim. Moreover, such stroboscope devices exhibit a systematic error at 45 r.p.m. At a speed of 45 r.p.m. and an operating frequency of 50 Hz 133⅓ stroboscope marks are required on the turntable rim. However, since such a division is not practical, only 133 marks are used. Thus, a systematic error of ¼% is accepted. This means that when the stroboscope image is stationary that the actual speed deviates ¼% from the nominal speed.

It is an object of the invention to provide a stroboscope device which in spite of different speeds and despite different mains frequencies functions with a single stroboscope pattern.

In a stroboscope device for a record player in accordance with the invention the turntable rim is provided with a single stroboscope pattern or ring for the relevant speeds and the marks of the stroboscope ring, as they pass a light pulse generator, are optically comparable with light pulse trains produced by the light pulse generator and corresponding to the nominal turntable speed.

When the light pulse generator supplies an appropriate line pulse train of nominal stroboscope frequency for each nominal speed, one stroboscope pattern will suffice for all the standard speeds. The nominal stroboscope frequency corresponding to the specific speed in each time adapted to the changed turntable speed.

In accordance with a further embodiment of the invention the light pulse trains for the various speeds are generated by filtering a harmonic from the mains frequency after half-wave rectification to render the waveform non-sinusoidal from which harmonic a nominal stroboscope frequency corresponding to the pulse train is derived by division in one or more frequency dividers and after processing is applied to the light pulse generator as a train of current pulses. For the standard turntable speeds of 33⅓ and 45 r.p.m. a master frequency of 300 Hz is then adapted. For 50 Hz mains operation this is then the 6th harmonic and for 60 Hz operation the 5th harmonic.

In accordance with a further embodiment of the invention the non-sinusoidal or rectified mains frequency of 50 or 60 Hz is applied to a filter, which transmits a master frequency of 300 Hz and supplies it, after amplification and processing, to a frequency divider, which divides the master frequency of 300 Hz in a ratio of 3:1, yielding a nominal stroboscope frequency of 100 Hz at 33⅓ r.p.m.

For a turntable speed of 45 r.p.m. the filter transmits a master frequency of 300 Hz, which has been filtered out of the non-sinusoidal or rectified mains frequency of 50 or 60 Hz, and after amplification and processing applies it to two frequency dividers. One divider divides in the ratio 4:1 (75 Hz) and the other in the ratio of 5:1 (60 Hz), and the respective intermediate frequencies of 75 and 60 Hz obtained by division are multiplied in a multiplicative mixer, yielding a nominal stroboscope frequency of 135 Hz that can be filtered out for 45 r.p.m.

The master frequency need not be derived from the mains frequency. It is alternatively possible to derive it from an internal source, for example by division of a quartz-oscillator frequency.

For the two nominal stroboscope frequencies of 100 and 135 Hz processing of the pulses is necessary, for which purpose known means such as Schmitt triggers may be used. After amplification in an amplifier tube the pulses, which have been made rectangular and have been filtered, are applied to a light-emitting diode which serves as light-pulse generator. In the case of a stroboscope ring with 180 marks, which are divided over the turntable circumference, possible deviations of the turntable speed from the nominal speed are indicated by means of the light-emitting diode.

Figure 2:
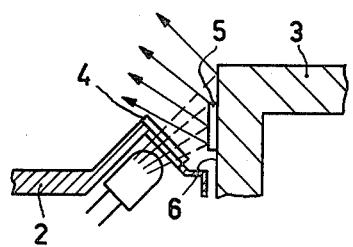

The invention will be described in more detail with reference to the drawing which shows a preferred embodiment. In the drawing:

FIG. 1 shows a circuit arrangement for producing nominal stroboscope frequencies for different turntable speeds, FIG. 2 illustrates the cooperation of the stroboscope marking and the light pulse generator.

The circuit arrangement shown in the drawing is used in a high-quality record player equipped with a stroboscope. A light-emitting diode 1 of the circuit arrangement receives voltage pulse trains depending on the input mains frequency. The voltage pulse trains correspond to nominal stroboscope frequencies in accordance with the turntable speeds of 33⅓ and 45 r.p.m. The light-emitting diode is rigidly mounted in the deck plate 2 directly adjacent the turntable 3 (FIG. 2). Through a window 4 the light-emitting diode throws trains of light pulses, which correspond to the nominal stroboscope frequencies, onto the turntable rim 6 provided with the stroboscope marks 5 at such an angle that the light is reflected upwards. However, different combinations and configurations of stroboscope patterns or marks and a light-emitting diode or other light pulse generator are useful with the invention.

The turntable rim 6 is provided with 180 stroboscope ring marks. These 180 stroboscope ring marks serve for comparison between the nominal stroboscope frequency, which is indicated by the light pulse train produced by the light-emitting diode, and the actual speed of the turntable. When the nominal stroboscope frequency and the actual speed of the turntable (thus the speed with which the stroboscope ring marks pass the light-emitting diode) coincide, the stroboscope image is stationary. When the two frequencies do not coincide, the image will move. It can be made stationary by adjustment.

Via its input terminal 7 the circuit arrangement receives a half-wave rectified pulsating voltage with a pulse frequency of 50 or 60 Hz. The pulsating direct voltage is applied to a filter 8, which transmits the 6th or 5th harmonic of the pulsating voltage. This 5th or 6th harmonic represents a master frequency fo of 300 Hz. If the pulse frequency of the pulsating direct voltage is 50 Hz, the 6th harmonic is filtered out. If the pulse frequency of the applied pulsating direct voltage is 60 Hz the 5th harmonic is filtered out.

Thus, both in the case of 50 Hz and 60 Hz operation, the filter 8 supplies a pulsating direct voltage with the master frequency fo=300 Hz. This voltage is applied to a Schmitt trigger 9, which processes the pulsating voltage so that a voltage pulse train with a frequency of 300 Hz is obtained. Parallel-connected frequency dividers 10a, 10b and 10c are connected to the Schmitt trigger 9. The frequency divider 10a divides the applied master frequency fo in a ratio of 3:1 and thus provides a voltage pulse train with a frequency $f33\frac{1}{3}=100$ Hz. The frequency divider 10b divides the applied master frequency fo in a ratio of 4:1 and supplies a pulse train with the intermediate frequency fb=75 Hz. The frequency divider 10c divides the master frequency fo in a ratio of 5:1 and supplies an intermediate frequency fc=60 Hz.

The frequency $f33\frac{1}{3}=100$ Hz corresponds to a turntable speed of $33\frac{1}{3}$ r.p.m. Thus, the frequency $f33\frac{1}{3}$ is the nominal stroboscope frequency for $33\frac{1}{3}$ r.p.m. The frequencies fb and fc are applied to a multiplicative mixer 11 whose output contains frequencies of 135 Hz and 15 Hz. In the following high-pass filter, comprising the capacitor 12 and the resistor 15, the frequency of 15 Hz is filtered out. Thus only the frequency f45=135 Hz is transferred to a following trigger circuit 17, by which it is processed into the voltage pulse train F45=135 Hz. The voltage pulse train f45=135 Hz corresponds to a nominal stroboscope frequency for a turntable speed of 45 r.p.m.

Both the frequency $f33\frac{1}{3}$ and f45 are applied to a monostable 21 via a switch 19. The switch 19 determines which of the two frequencies is applied to the monostable 21. The monostable is a multivibrator stage which for a specific time occupies an unstable state and after that time returns to the stable state. Thus, the pulse trains are in a way further processed. For example, in such a way the image quality adjustment can be changed with the period of the monostable. For this purpose a potentiometer 22 may be included. Via a pulse amplifier 23, for example a transistor emitter circuit, the processed current pulses of suitable height are applied to the light-emitting diode 1.

The blocks 8, 9, 10a, to 10c, 11, 17, 21 and 23 may be incorporated in an integrated circuit.

On the turntable rim only one stroboscope ring is necessary, because the marks of the stroboscope ring are not adapted to the nominal stroboscope frequency as was done previously, but the light pulse train of the nominal stroboscope frequency is adapted to the turntable speed.

What is claimed is:

1. A stroboscope device for a record player for monitoring nominal rotational speeds of approximately $33\frac{1}{3}$ and 45 r.p.m., comprising a single stroboscope pattern ring, and light pulse means for illuminating the pattern with a light pulse train having a pulse frequency derived from a given frequency, the light pulse generator producing a non-overlapping steady image at the nominal speeds.

2. A device as claimed in claim 1 wherein said light pulse means includes
    means for generating a master frequency from a given frequency,
    divider means for generating a pulse frequency from said master frequency,
    a light pulse generator arranged for illuminating the stroboscope pattern, and
    means for applying a train of current pulses at said pulse frequency to the light pulse generator for optical comparison of the pattern speed with said nominal speeds.

3. A stroboscope device for monitoring at least two different nominal speeds, the higher nominal speed being a non-integral-multiple of the lower speed, comprising a single stroboscope pattern, and a light pulse means for illuminating the pattern, said means including
    means for generating a master frequency from a given frequency,
    divider means for generating a pulse frequency from said master frequency,
    a light pulse generator arranged for illuminating the stroboscope pattern, and
    means for applying a train of current pulses at said pulse frequency to the light pulse generator for optical comparison of the pattern speed with said nominal speeds.

4. A device as claimed in claims 2 or 3 wherein said given frequency is either of two different a-c mains frequencies, and said means for generating a master comprises a half-wave rectifier and a filter for filtering a same frequency from the half-wave rectifier, said same frequency being a harmonic frequency of said two different mains frequencies.

5. A device as claimed in claims 2 or 3 wherein said divider means includes first and second dividers having different output frequencies and a multiplicative mixer means for mixing said output frequencies to provide a pulse frequency.

6. A device as claimed in claim 2 wherein said master frequency is 300 Hz; and said divider means includes first and second dividers having output frequencies of 60 and 75 Hz respectively, and a multiplicative mixer for mixing said output frequencies to provide a pulse frequency of 135 Hz for stroboscopic comparison of 45 r.p.m. nominal speed.

7. A device as claimed in claim 6 wherein said divider means further includes a 3:1 divider to provide a pulse frequency of 100 Hz for stroboscopic comparison of 33 r.p.m. nominal speed.

8. A device as claimed in claims 2, 3, or 6 wherein said given frequency is a quartz-oscillator frequency, and said means for generating a master comprises a further divider.

* * * * *